United States Patent [19]
Felker

[11] 3,915,678
[45] Oct. 28, 1975

[54] CONDENSER FILTER FOR INTERNAL COMBUSTION ENGINES

[76] Inventor: George A. Felker, 873 Davis Ave., Pattsville, Pa. 17901

[22] Filed: Oct. 15, 1973

[21] Appl. No.: 406,558

[52] U.S. Cl. .............. 55/319; 55/323; 55/486; 55/522; 55/526; 55/DIG. 15
[51] Int. Cl.² ............................. B01D 50/00
[58] Field of Search ...... 55/DIG. 16, 319, 320, 323, 55/332, 333, 337, 482, 486, 522, 526

[56] References Cited
UNITED STATES PATENTS

| 941,675 | 11/1909 | Green | 55/323 |
| 2,413,769 | 1/1947 | Kasten | 55/486 |
| 2,427,733 | 9/1947 | McCann | 210/489 |
| 2,942,691 | 6/1960 | Dillon | 55/522 |
| 2,981,367 | 4/1961 | Sprouse | 55/DIG. 16 |
| 3,721,069 | 3/1973 | Walker | 55/319 |

*Primary Examiner*—Bernard Nozick

[57] ABSTRACT

This device consists of a housing having a sump portion which will collect liquid and filter means within the housing carrying brass or steel wool and foam rubber for multi-stage filtering of impurities.

2 Claims, 2 Drawing Figures

U.S. Patent   Oct. 28, 1975   3,915,678

CONDENSER FILTER FOR INTERNAL COMBUSTION ENGINES

SPECIFICATION

This invention relates to gas purifying devices, and more particularly to a condenser filter for internal combustion engines.

It is therefore the principal object of this invention to provide a condenser filter which will condense oil and water which will and settle in the sump portion of the device.

Another object of the present invention is to provide a condenser filter which will have means for further filtering of the gases, by means of brass or steel wool which will be the first stage of purification, the second stage containing foam rubber for the final filtering of the gases prior to the gases being returned to the engine through the carburetor for burning in the combustion chambers of the engine.

Another object of this invention is to provide a device of the type described, which will have a removeable cover so as to enable the filtering components to be removed as well as the liquid collected within the sump.

A further object of this invention is to provide a device of the type described, which will impart, greater volumetric efficiency to the combustion engine, thus resulting in better gasoline mileage and the device also serves as a means of preventing sludge build-up within the engine and the valve cover chambers.

A still further object of the present invention is to provide a device of the type described, which will prevent the oil, water and sludge from the engine, from being forced back into the engine through the carburetor as is the result in present day automotive vehicles.

Other objects of the invention are to provide a condenser filter which is simple in design, inexpensive to manufacture, rugged in construction, easy to use and efficient in operation.

These and other objects will be readily evident upon a study of the following specification and the accompanying drawing, wherein.

Figure 1:
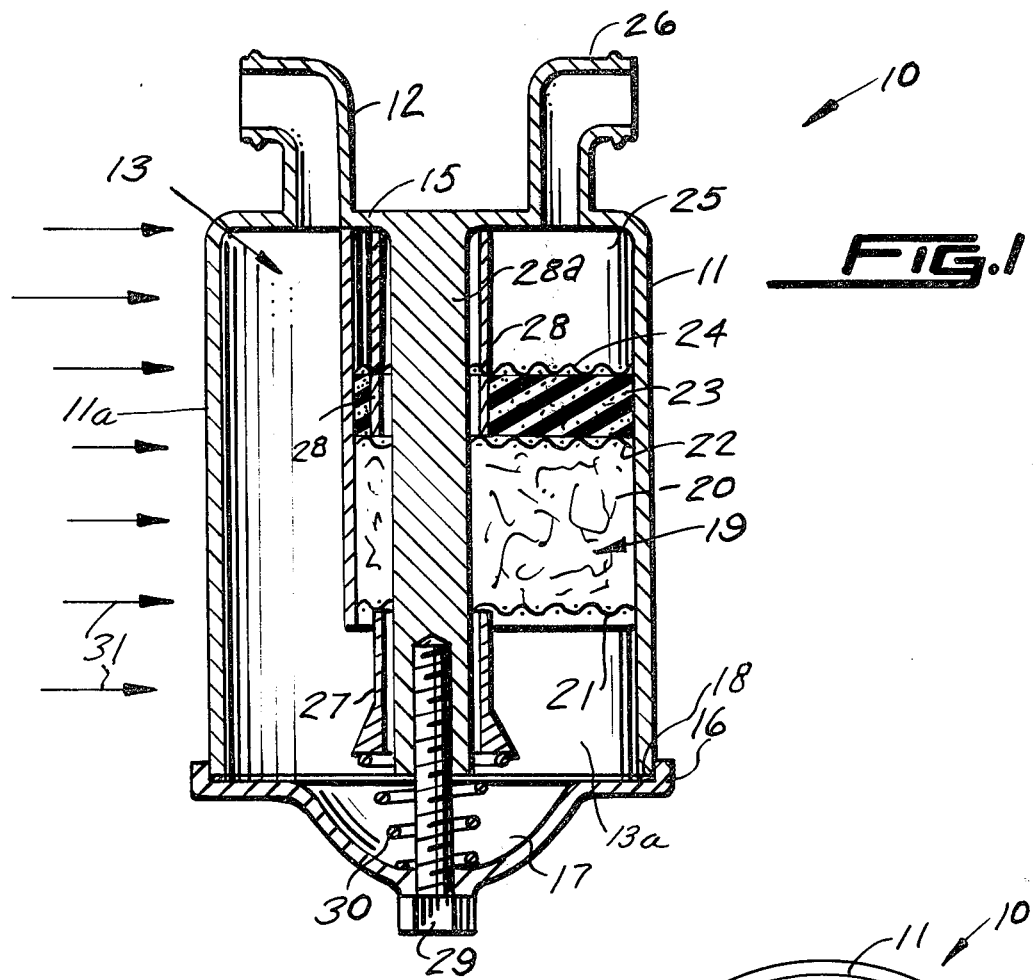
FIG. 1 is a cross sectional view taken along the line 1—1 of FIG. 2.
Figure 2:
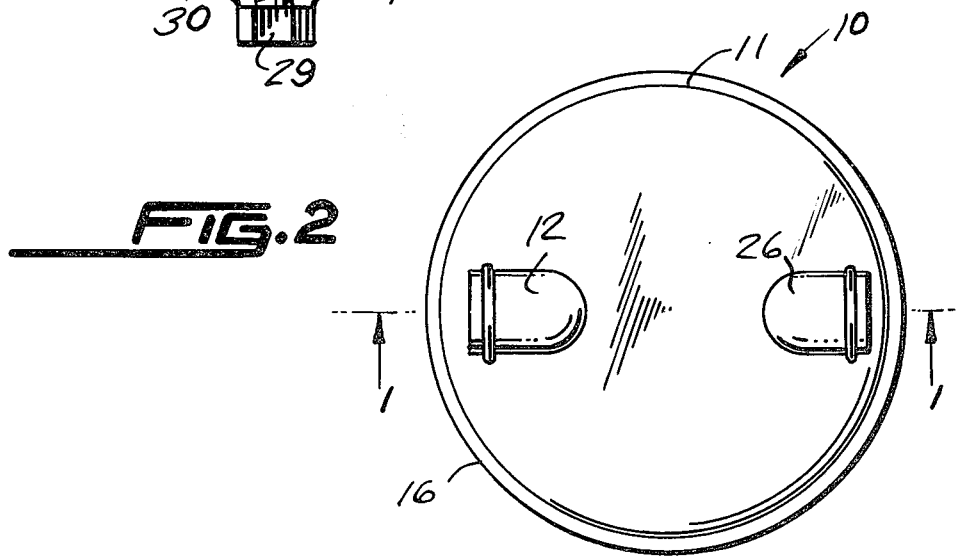
FIG. 2 is a top plan view of the present invention.

According to this invention, a condenser filter 10 is shown to include a hollow housing 11 having a chamber 13 through which crankcase emissions or fumes are entered by means of the inlet projection 12 of housing 11. The fumes will travel from the valve cover plate of the engine, into the inlet projection 12 and thereinto chamber 13. As may be apparent, this chamber is an elongated one and is formed between baffle 14, described below, and the lateral housing adjacent thereto designated as 11a.

On the interior of housing 11 is secured, fixedly, a baffle member 14 which is secured fixedly to the end wall 15 of housing 11. A cap member 16 of device 10 is provided with a recess 17 which is the lowest portion of the sump of the device 10 which collects the liquid after condensation which hereinafter will be described. Cap 16 is removeable from the opening of housing 11 and is held fast against a gasket 18. A brass or steel wool 20 is carried within chamber 19 which is formed by means of a pair of screens 21 and 22, the screens 21 and 22 being in abutment at their outer peripheries, with the inner periphery of housing 11 and baffle 14. Foam rubber 23 is carried above screen 22 and a third screen 24 is on top of the foam rubber 23, the foam rubber 23 serving as the final filtering stage within the chamber 25 prior to the gas being carried out of the outlet projection 26, and into the carburetor of the engine. A spacer 27 is carried beneath screen 21 and a spacer 28 is carried within the foam rubber 23, the spacer 28 extending upwards to the end wall 15. The spacers 27 and 28 are carried and spaced apart from a central projection or post 28a which extends and is integral with the end wall 15 of housing 11. A threaded bolt fastener 29 serves to hold cap 16 to the projection 28a and a spring 30 is carried upon bolt fastener 29 within the recess 17 of cap 16, the ends of springs 30, one each, urging against the recess 17 and the projection 28a and against spacer 27. The opposite end of spacer 27 abuts with screen 21.

It shall be noted that impact or cooling air as shown by the arrows 31, will strike the outer periphery of housing 11 and thus condense the oil of body 10 and water vapors so that by gravity means, they will accumulate in the sump portion within the bottom of device 10. The gases that do not liquefy and collect within the sump, will then travel laterally through what may be described as a lower chamber, designated 13a, disposed below screen 21 and mainly to one side of post 28a. As is evident, this lower chamber is in communication with the lower end of chamber 13. The gases then travel upwards through screen 21 and into the brass or steel wool 20 within the chamber 19. The final filtering is achieved as the gases are passed through screen 22 and into the foam rubber 23 where upon the final filtering is accomplished and the gas is then passed through screen 24 and through outlet 26 where upon they are carried back to the carburetor which will pass them into the combustion chambers of the engine to be burned.

It shall be noted that if all the oil and water fumes are not fully condensed within the lower portion of device 10, they will then flow through the brass or stainless steel wool where the flow of the oil and water fumes and other gases, will be slowed down and again condensation will take place thus filtering out and dropping the liquid into the sump. The resulting gases left, will continue to flow through the foam rubber 23, where again the gases will be filtered of impurities and will be egressed from outlet projection 26. Some scrubbing action may occur as the up flowing gaseous stream makes contact with the liquid filtered out as the latter flows downwardly through the filters.

What I now claim is:

1. A condenser filter device for an internal combustion engine for controlling crankcase emissions by subjecting them first to condensation and then, after separation of the resulting condensate, to filtration, comprising a hollow body enclosed by a lateral housing and by an upper end wall and a lower removable cap, said cap being outwardly dished to form a recess, a central post in said body extending from the end wall to the cap, a baffle extending from said end wall towards said cap on one side of the post, an elongated hollow chamber formed between said baffle and said lateral housing adjacent thereto and extending the length of said body, said chamber at the lower end thereof opening directly into said recess, an inlet in said end wall for introducing into said elongated chamber a gaseous stream of crankcase emissions including air and condensible materials, said adjacent housing of the chamber being exposed to cooling air externally thereof, thereby to condense a large part of said condensible materials in said stream, said recess forming a sump into which the resulting condensate may flow by gravity, a lower chamber in said body disposed mainly on the other side of said post and in communication with the lower end of said elongated chamber, a first stage filter disposed above said lower chamber and oppositely of said elongated chamber and supported between the baffle and the housing opposite the baffle, a second stage filter disposed above said first stage and supported similarly thereto, both filter stages being positioned mainly on the said other side of the post, said gaseous stream flowing downwardly through the elongated chamber, then laterally through the lower chamber, and then upwardly through said filter stages, the latter helping to provide further condensation of residual condensible materials from said stream and the resulting condensate being then filtered from the stream and allowed to flow by gravity into said sump, and an outlet in said end wall above the second stage filter for withdrawing the now purified gaseous stream from said body for return to the carburetor of said engine.

2. Device of claim 1 wherein the first stage filter comprises metal wool and the second stage filter comprises foam rubber.

* * * * *